May 12, 1936.  S. GRAHAM  2,040,305
WIND SPEED AND DIRECTION INDICATOR
Filed Aug. 14, 1929   2 Sheets-Sheet 1
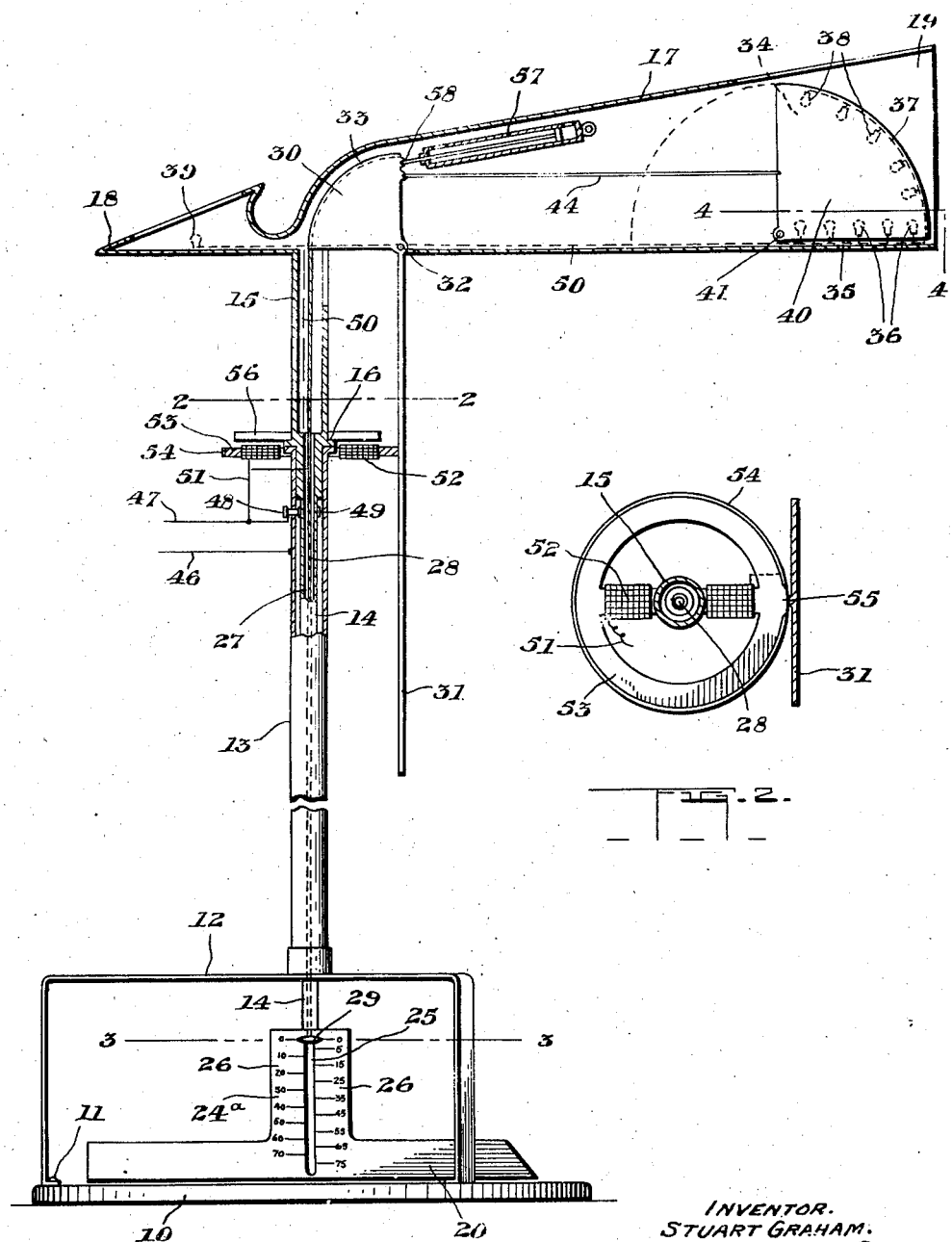
INVENTOR.
STUART GRAHAM.
BY
ATT'Y.

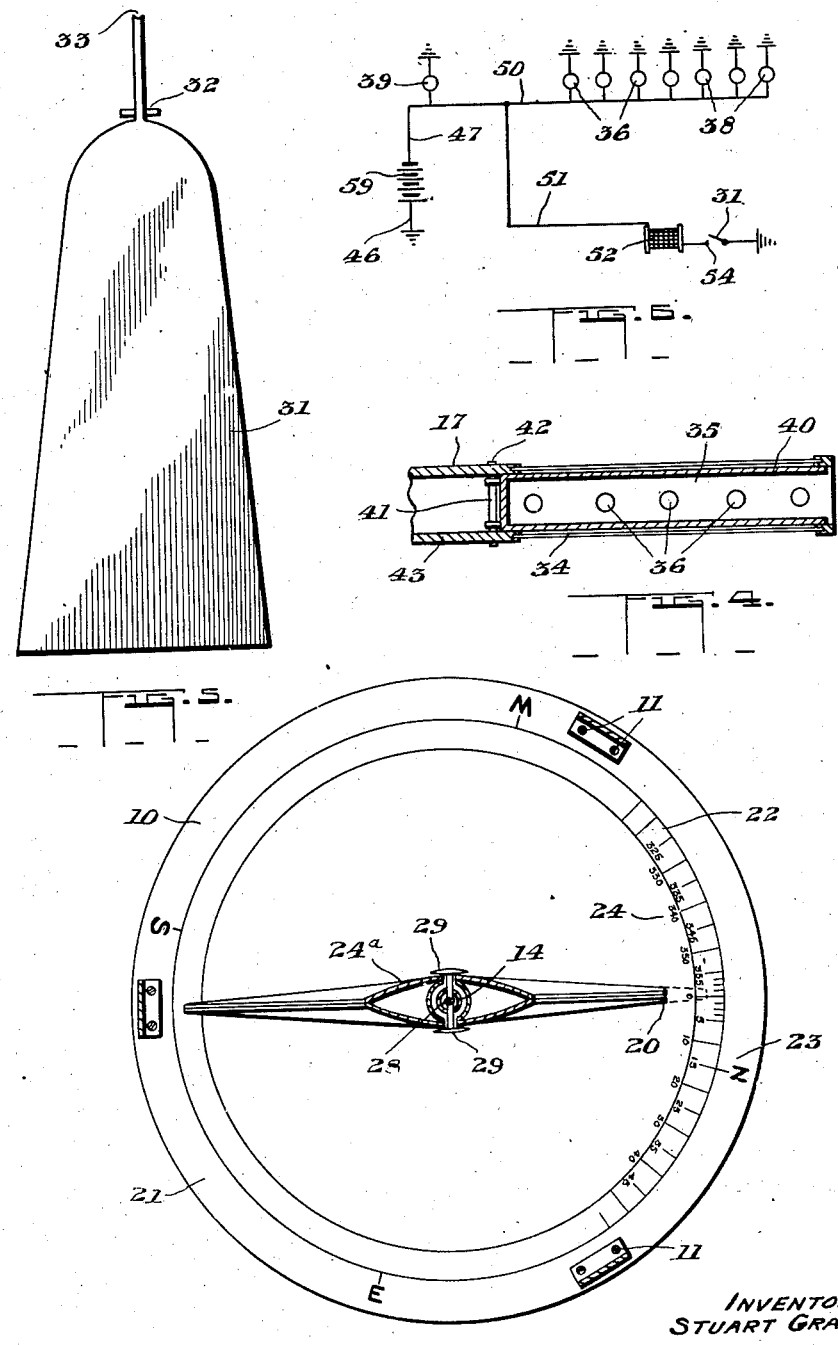

Patented May 12, 1936

2,040,305

UNITED STATES PATENT OFFICE 2,040,305

WIND SPEED AND DIRECTION INDICATOR

Stuart Graham, Ottawa, Ontario, Canada

Application August 14, 1929, Serial No. 385,905

21 Claims. (Cl. 73—55)

This invention relates to improvements in wind speed and direction indicators, and the objects of the invention are to provide a simply constructed, light and durable apparatus for automatically supplying accurate information relative to the existence of and speed and direction of the wind.

It is well known to those versed in the art of aeronautics that in the event there is any appreciable wind, the pilot of an aeroplane should know the direction of the wind before he attempts to take-off or land because of the fact that he should take-off and land directly into the wind. In order to properly gauge the extent of his run on the ground incidental to his obtaining flight in his take-off or his coming to a stop on the ground when landing, he should know the approximate speed of the wind in order to estimate the force of the wind into which he is travelling. Obviously there are many instances when the speed of the wind so nearly approaches zero as to be negligible as far as is concerned the necessity of landing into or taking-off into the barely existing wind, and under these conditions the pilot, if he be informed of these conditions should totally disregard the wind and take into consideration the nature and length of the runway provided by the landing field and the presence or absence of surrounding obstructions to flight, and land or take-off in a direction under which such ground conditions would best suit his purposes.

An object of this invention therefore is to provide an apparatus of the above description that can be manufactured at comparatively low cost, and that can be readily installed, in connection with landing fields and the like, for aeroplanes.

A further object is to provide an apparatus of this character adapted to extend outside a building, and inwardly thereof, to simultaneously indicate to observers in the air and on the ground the existence of and speed and direction of the wind, and while thus supplying at different points this information, will automatically register the same.

Yet another and primary object is to provide an apparatus of this kind that will operate and perform the functions required of it in indicating the existence of and speed and direction of the wind in darkness, as well as in daylight, and also of indicating to the pilot the direction and speed of the wind so the pilot may properly decide in which direction and at what speed he should land in accordance with the wind conditions, or irrespective thereof as far as the direction of the landing is concerned when the wind speed is below a certain predetermined magnitude.

Various forms of the apparatus to be described will suggest themselves to those skilled in the art; it is, therefore, not intended that the present application should be limited to any particular form of construction.

With the foregoing objects, the main features of novelty of the present invention consist in:—

A rotatably mounted shaft provided with a vane and a pointer removed from one another and rotatable therewith, a wind speed indicating member operatively connected to the vane, a second wind speed indicator co-operating with the pointer and operable by the first mentioned wind speed indicating member whereby the speed of the wind is automatically indicated at different points, means associated with the pointer for registering the speed of the wind, and means associated with the pointer for simultaneously registering the direction of the wind relative to the geographic and magnetic poles, illuminating means for automatically indicating the speed and direction of the wind, and means for automatically returning the vane to normal position on the speed of the wind decreasing.

In the accompanying drawings, an example of the apparatus is disclosed, in which like numerals of reference indicate corresponding parts in each figure.

In these drawings:

Fig. 1 is a side elevation of the apparatus as a whole.

Fig. 2 is a section on line 2—2 of Fig. 1.

Fig. 3 is a section on line 3—3 of Fig. 1.

Fig. 4 is a section on line 4—4 of Fig. 1.

Fig. 5 is an enlarged detail of the wind speed indicator.

Fig. 6 is a diagrammatic view of the electric circuits.

Referring now more particularly to the drawings, 10 designates a base of any suitable material or construction on which is rigidly and detachably secured, by means of screws or the like 11, a stand 12 provided with a vertically extending tubular casing 13 in which extends a rotatable shaft 14 formed with a tubular extension 15 at its upper end, and a collar 16 engaging with the top of the casing forming a bearing for the shaft 14 to rotate in. Rigidly connected, in any suitable manner, to the top of the shaft 14 is a vane 17 rotatable about a vertical axis with said shaft and so proportioned at the restricted end 18 that it will always point into wind, and so formed at the opposite or enlarged end 19 that it will always point down wind.

Rigidly secured to the lower end of the shaft 14 is a pointer member 20 rotatable therewith; while co-operating with the pointer and countersunk in the frame 10, are a pair of discs 21 and 22 with calibrated peripheries, as at 23 and 24, relative to the geographic and magnetic poles respectively, whereby on the vane 17 being moved by the wind, the pointer 20 is simultaneously moved to automatically indicate and register on the discs 21 and 22 the direction of the wind. The pointer 20 is formed with an extended center portion or stem 24a provided with vertical slots 25 having degree calibrations on each side, as at 26.

Within the shaft 14 and through a suitable passageway or bore 27 is a cable or cord 28 on the lower end of which is an indicator 29 in the body of the pointer 20 registering opposite the calibrations along the slots 25. The other end of the cable 28 is connected to a quadrant 30 integral with which is a wind speed responsive member 31 of any suitable form hingedly mounted, as at 32, on the vane 17, the quadrant 30 moving about the axis 32. In the outer or peripheral face of the quadrant is a groove 33 to carry the cable or cord 28.

From the foregoing, it will be seen that on the vane 17 moving under the influence of the wind, the pointer 20 will automatically and simultaneously move in the same direction indicating and registering on the discs 21 and 22 the direction of the wind. At the same time, any movement of the surface member 31 from neutral vertical position will operate the quadrant 30, which in turn will operate through the cable 28, the wind speed indicator 29, the movements of which are automatically indicated through the degree calibrations 26 thereby indicating the speed of the wind.

Coming now to a very important feature of the invention i. e.; the means operable by the surface member 31 for indicating by lights or other illuminating means the speed and direction of the wind. In the present example, the lights are arranged on the vane.

As here shown, the enlarged end 19 of the vane 17 is cut out as at 34, and in the cut out portion on the frame 35 of the vane are a series of lamps 36, while suitably mounted on an arcuate band or the like 37 are a further series or bank 38 of lamps; the entire cut out portion may be suitably fitted with reflectors and covered with some suitable transparent or translucent material so as to provide a diffused light, while at the opposite pointed end 18 of the vane is a lamp 39 so arranged as to illuminate the sides of the vane 17. Associated and co-operating with the lamps 36 and 38 is a double shutter 40 of any suitable form swingingly mounted, as at 41, on a shaft 42 supported in the frame 43 of the vane. This shutter is connected to a rod, cable, or the like, 44 in turn connected to the quadrant 30, so that when the latter is operated by the surface member 31, the shutter 40 will be opened or swung backwardly, according to the speed of the wind, and on the wind decreasing in speed until the member 31 assumes a normal vertical position, the rod 44 will cause the double shutter 40 (see Fig. 4) on each side of the cut out portion 34 of the vane, to completely cover it, then on the speed of the wind increasing and moving the surface member 31, the rod 44 causes the double shutter 40 to open progressively illuminating the cut out portion 34 of the vane and indicating the speed of the wind, the rotation of the shutter about its pivot 41 being effective to allow the diffused light to become visible in variable degrees so that the position of the double shutter 40 regulates the area or the sector of the light or cut-out portion 34 which is visible to the observer. While such a cut-out portion is shown in the drawings as being a quadrant this cut-out portion might easily be of any other desired shape, such as a semi-circle for instance. As will be seen by reference to Figs. 1 and 4 when there is a wind of negligible or predetermined speed, all of the light cut-out portion 34 will be invisible because of the postion of the opaque double-shutter 40 which obscures it from view. Upon the existence of a wind of appreciable speed the shutter 40 is rotated by means of the wind pressure against the surface 31 and a sector of the area of the lighted cut-out portion 34 becomes visible to the observer by reason of the movement of the double-shutter 40 to that extent. Thus the observer may readily determine the relative speed of the wind by noting the shape of the lighted sector, he having been previously informed as to the maximum and minimum speed indication provided for by the instrument in its capacity of indication varying from zero light as a minimum to a fully illuminated quadrant as a maximum indication.

For illuminating the lights in the vane, I provide an electric circuit (see Fig. 1) in which a feed line 46 is grounded to the casing 13 on one side. The first tap 47 going to a brush 48 feeding an insulated ring 49 and thence through lead wire 50 to the lights 36, 38, 39 and ground.

It will thus be seen that the lights or illuminating means, here shown as in the vane, are normally continuously lighted, but can be readily controlled during daylight by an ordinary switch (not shown). In darkness, the lights are always on and indicate the speed and direction of the wind automatically, as above explained, by the operation of the shutter 40 through the wind speed, responsive or surface member 31, and light 39.

A wind of two or three miles an hour is practically negligible for the present purposes—that is to say, a wind of such a speed need not be taken into consideration by the pilot as he need not necessarily take-off or land into a wind of such slow rate of speed. There are many occasions therefore when a pilot if he knew of the practical non-existence of any wind would land or take-off in accordance with the best runway conditions, which course would not be open to him if there were an appreciable cross wind. Consequently in the provision of a wind indicating device, such as disclosed hereinabove, it is of importance to indicate the practical non-existence of wind to the pilot in order that he may avail himself of such valuable information. The most practical manner of imparting this information to the pilot is to so arrange the wind vane that he will always land or take-off in accordance with the direction in which the wind vane is pointing. To accomplish this it is therefore necessary to so arrange the operating mechanism of the wind vane that in case of the practical non-existence of a wind at the airdrome, the wind vane shall point in the direction of the longest runway provided for by the airdrome.

For automatically returning the vane to a predetermined position, when there is no appreciable wind (considering for instance such a wind to be of a lesser speed than three miles per hour), a second tap 51 from the feed line goes through a solenoid 52 in an insulating gallery 53 rotatably mounted on the casing 13, to a brass ring 54 on the gallery provided with an insulating gap 55 (see Fig. 2). This ring is designed to be engaged by the member 31 when the latter is in inoperative or vertical position closing the circuit and causing the solenoid to be energized with a predetermined polarity. Permanent bar magnets 56 rigidly attached to the shaft 14, are within the active magnetic field of the solenoid 52 and being actuated by it cause the vane to rotate until the gap 55 is reached, where the circuit in the solenoid will be broken and the vane will remain in that position in the absence of wind. The solenoid 52 is adjustably mounted on the casing 13 so that it may be rotated to vary the desired direction of the inoperative position which is governed by the gap 55. On the wind rising, the member 31 will be moved accordingly, the circuit still remaining open and the member 31 and the vane 17 operating under the influence of the wind, then on the wind suddenly dropping, the member 31 drops into contact with the ring 54 closing the circuit and returning the vane to normal position.

For stabilizing the operation of the quadrant 30, I provide a stabilizer 57 supported in any suitable manner on the vane 17, and connected, as at 58, to the quadrant.

In operation, the discs 21 and 22, as illustrated in Fig. 3, are set according to location and relative to the true north. In the present instance this shows a variation and direction of 15 degrees westerly on the inner or magnetic direction disc 22, the outer disc 21 being true direction. The speed of the wind is automatically indicated during the day or night in the air. Those on the ground may observe the direction and approximate speed of the wind by observing the direction in which the vane is pointing and observing the position of the shutter 40 with respect to the opening in the vane, the same as a pilot in the air. For a more precise determination of the speed and direction of the wind, a ground observer may read the speed of the wind as indicated by the pointer 29 on its scale. The ground observer may also determine the direction of the wind by observing the position of the pointer 20 on the scale 22.

In the diagrammatic view shown in Fig. 6, the lighting circuit comprises battery 59, lead 47 to light 39 and ground and lead 50 to lights 36 and 38 and ground. The vane operating circuit comprising lead 51, solenoid 52, ring 54 and surface member 31 to ground.

Modifications may be made in the apparatus above described within the scope of the claims, without departing from the spirit or scope thereof.

What I claim for my invention is:

1. A wind speed and direction indicator comprising a rotatably mounted vane, a pressure plate swingably connected to said vane, adapted in normal position to remain vertical and to swing under the influence of the wind, a wind speed indicator connected to the pressure plate and automatically operable therewith to simultaneously indicate the speed of the wind, illuminating means adapted to be excluded from view and means operable by the pressure plate for controlling the area of visibility of the illumination afforded by the illuminating means.

2. A wind speed and direction indicating apparatus comprising a rotatable vane, a wind speed indicator including a pressure plate operatively connected to said vane, a pointer cooperating with the vane and operable thereby, a second wind speed indicator operable by the first mentioned wind speed indicator, whereby the direction and speed of the wind are simultaneously indicated at points removed from one another, and means controlled by the engagement therewith by said pressure plate for returning the vane to a predetermined position upon the decrease in speed of the wind below a predetermined rate.

3. A wind speed and direction indicating device comprising a rotatable shaft, a vane and a pointer on said shaft removed from one another and rotatable therewith, whereby on the vane being operated the pointer is simultaneously operated, a wind speed responsive member swingably suspended from the vane, a wind speed indicator connected to said wind responsive member, whereby on the latter being operated the wind speed indicator is simultaneously operated.

4. A wind speed and direction indicating device comprising a rotatable shaft, a vane and a pointer on said shaft, a wind speed indicator including a wind responsive member connected to the vane and means for dampening the movements of said member, said pointer and wind responsive member being adapted to be moved to bring about an indication of the direction and speed of the wind, and means comprising calibrations associated with said second named indicator, and discs also associated with the pointer calibrated for the magnetic and geographic poles respectively.

5. A wind speed and direction indicator comprising a fixed casing, a vertical shaft rotatably mounted in said casing provided with a vane and a pointer, a wind speed responsive member pivotally connected to the vane, a wind speed indicating member operatively connected to the aforesaid member, means associated with the pointer and the wind speed indicating member for registering the direction and speed of the wind respectively and means for returning the vane to a predetermined position upon the decrease in speed of the wind below a predetermined rate.

6. In combination with a wind direction indicator comprising a freely rotatably mounted wind vane, means for returning said wind vane to a predetermined set position, a wind pressure operated device associated with said wind vane and said means, said last named means being adapted to be adjusted so as to fix the position to which said vane will be returned when the wind pressure on said wind pressure operated device is below a certain predetermined amount, said vane returning means being adapted to release said wind vane from such engagement when the wind pressure equals or exceeds said predetermined amount.

7. In combination with a wind direction indicator comprising a rotatably mounted wind vane, means for returning said wind vane to a predetermined set position, a wind pressure operated device carried by said wind vane, said device being electrically connected to said means which latter is adapted to be adjusted so as to fix the position to which said vane will return when the wind pressure on said device is below a certain predetermined amount so as to maintain said vane in said predetermined set position regardless of the direction of the wind, said vane returning means being adapted to release said wind vane from such engagement when the wind pressure equals or exceeds said predetermined amount so as to allow said wind vane to freely rotate in accordance with the direction of the wind.

8. In combination with a wind direction indicator comprising a rotatably mounted wind vane, means for returning said wind vane to a predetermined position, a wind pressure responsive device carried by said vane and operatively associated with said means, said means being adjustable so as to fix the position to which said vane will return in the absence of wind and released therefrom under the effect of the wind pressure allowing said vane to freely rotate so as to point into the wind free from the influence of said vane returning means until the operation of said wind responsive device becomes lessened below said predetermined amount due to a lessening of wind pressure to that extent.

9. In combination in a wind speed and direction indicator, said direction indicator comprising a rotatably mounted wind vane, a wind pressure operated device associated therewith, means controlled by said device for automatically returning said vane to a predetermined set position, said wind speed indicator comprising illumination means arranged in the form of a sector, said wind pressure operated device being adapted to conceal from or expose to view various sector portions of said lighted sector ranging in size from a total exposure of the entire illumination means to a zero quantity amounting to a total concealment from view of said illuminating means.

10. In combination with a wind speed and direction indicator comprising a freely rotatably mounted wind vane, means for returning said wind vane to a predetermined set position, a wind pressure responsive device associated with said wind vane and said means and adapted to control the operation of both, said means being adapted to be adjusted so as to fix the position to which said vane will return when the wind pressure on said wind responsive device is below a certain predetermined amount said vane returning means being adapted to release said wind vane from such engagement when the wind pressure equals or exceeds said predetermined amount, illuminating means arranged in the form of a sector, means operated by said wind pressure operated device for concealing and exposing to view various sector portions of said lighter sector ranging in size from that described by the illumination means to a zero quantity amounting to a total concealment from view of said illumination means.

11. In combination with a wind speed and direction indicator comprising a rotatably mounted wind vane, positive means for maintaining said wind vane in a predetermined set position, a wind pressure responsive device carried by said wind vane and operatively connected to said positive means, said means being adjustable to fix the position to which the wind vane will return when the wind pressure falls below a predetermined degree in accordance with the adjustment of said means, said wind speed indicator including a series of illuminated members arranged in the form of a sector, means operated by said wind pressure operated device for concealing and exposing to view various illuminated sector portions of said lighted sector ranging in size from that described by the illuminated members down to a zero quantity amounting to a total concealment of said illuminated members from view.

12. In a wind direction indicator, a rotatably mounted wind vane, means tending to bias said vane to a predetermined normal position, and a wind controlled means for effecting operation of said means when the wind speed falls below a predetermined magnitude.

13. In combination with a wind direction indicator comprising a rotatably mounted wind vane, a wind pressure operated device associated therewith, means regulated by said device for automatically returning said vane to a predetermined set position when the speed of the wind falls below a predetermined magnitude and adapted to operate irrespectively of the wind direction and speed so long as the latter remains under said predetermined magnitude.

14. A landing indicator for airports, comprising indicating means having a part movably responsive to wind currents for effecting a directional indication of said indicating means, means supporting said wind responsive part for rotation about a substantially vertical axis, means for returning said wind responsive part to a predetermined normal position, said returning means including an electrical drive and a control circuit therefor, and a wind responsive switch in the circuit for opening and closing the same, respectively, in the presence and absence of wind currents.

15. A landing indicator for airports, comprising a wind responsive member, means mounting the same for rotative movement in response to wind influences, means for positively imparting a rotary movement to said member sufficient to bring the latter to a predetermined normal indicating position, and wind controlled means for holding said imparting means inoperative during wind responsive movement of said member whereby the latter is free to respond to wind currents for being positioned thereby.

16. A landing indicator for airports, comprising an indicator member, means mounting the same for wind responsive movement about a fixed vertical axis, means independent of the indicator member for moving the latter to a predetermined indicating position in the absence of a contrary wind, said indicator member having a surface acted upon by the wind to move the same to a wind indicating position, and wind actuated means for rendering said moving means inoperative in the presence of movement effecting winds to which the indicator member responds.

17. A landing indicator for airports, comprising an indicator member, means mounting the same for rotative movement about an upright axis, means acted upon by wind currents for positioning the member to indicate the direction of the wind, a power drive for moving said member to a predetermined normal position, an electric control circuit for said power drive, apparatus having active circuit closing means and neutral opening means, said neutral means determining said normal position of the indicator member, wind-controlled means for rendering the active circuit closing means inoperative in the presence of wind currents, and operative connections between said apparatus and said drive for effecting opening of the circuit through said neutral means.

18. A landing indicator for airports, comprising an indicator member mounted for wind responsive movements, a track having an electrically active segment and an inactive rest portion, a contact member movable with said indicator member and engaging the track, a drive electrically connected in circuit with said active segment and said contact member which circuit is broken by said contact member engaging said rest portion, said drive being connected to said indicating member for returning the latter and said contact member to a normal position as determined by said rest portion, and wind actuated means movable to render the contact member inoperative for holding the circuit open when the indicator member is responding to wind influences.

19. In combination with a wind direction indicator and with means rotatably supporting said indicator, electro-magnetic means predeterminedly aligning said indicator upon said supporting means, an electric circuit actuating said electro-magnetic means when it is closed, and means closing said circuit at a predetermined wind velocity.

20. In combination with a wind tee, electro-motive means predeterminedly aligning said wind tee when they are energized, a switch controlling said electro-motive means, and a wind actuated mechanism opening and closing said switches when actuated and released by a wind, respectively.

21. In combination with a wind direction indicator and with means rotatably supporting said indicator, electro-magnetic means comprising spaced complementary magnets for predeterminedly aligning said indicator upon said supporting means, an electric circuit actuating said electro-magnetic means when it is closed and means closing said circuit at a predetermined wind velocity.

STUART GRAHAM.